May 16, 1933.  J. H. K. McCOLLUM ET AL  1,909,372
VARIABLE STROKE INTERNAL COMBUSTION ENGINE
Original Filed April 4, 1928   5 Sheets-Sheet 1
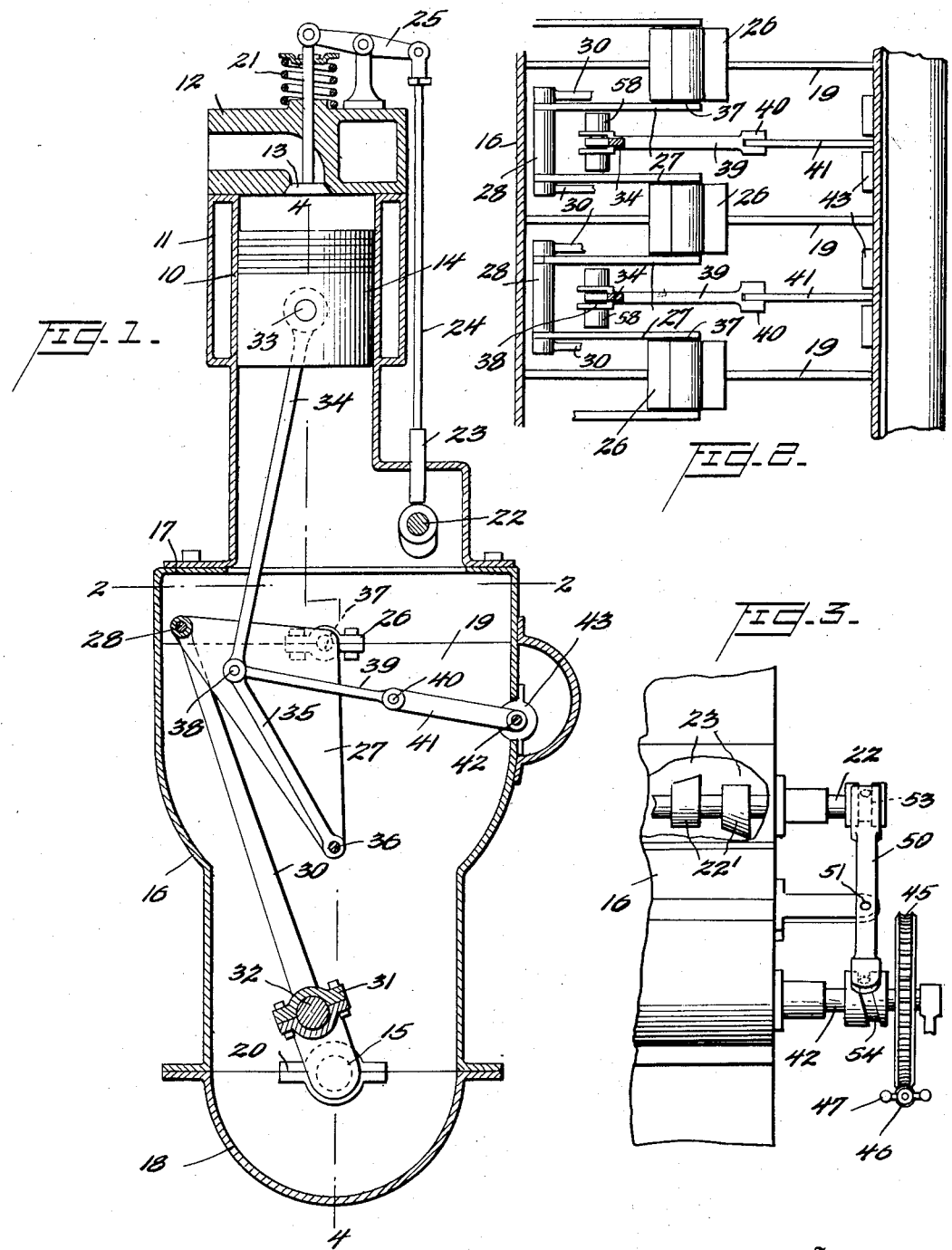

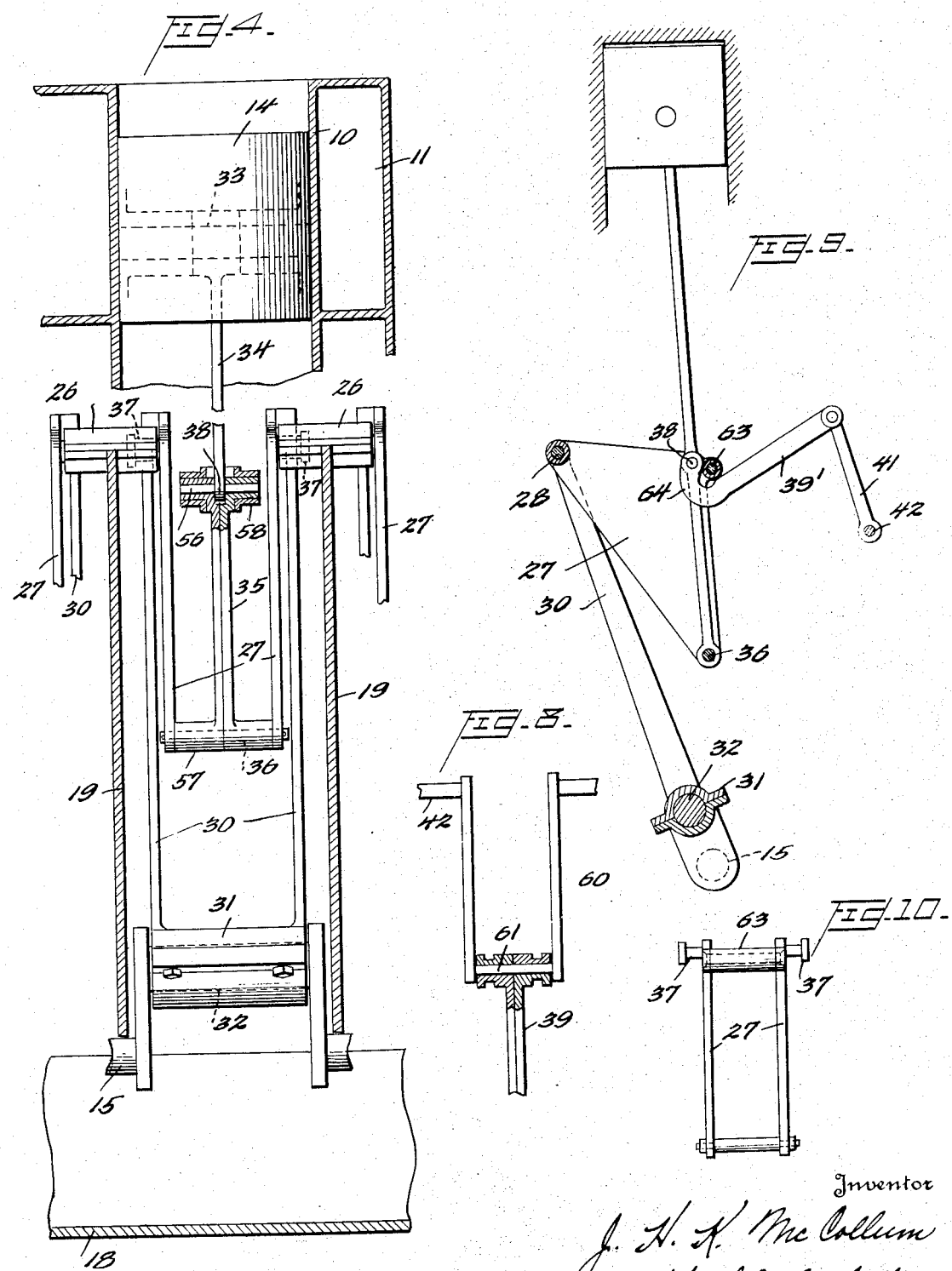

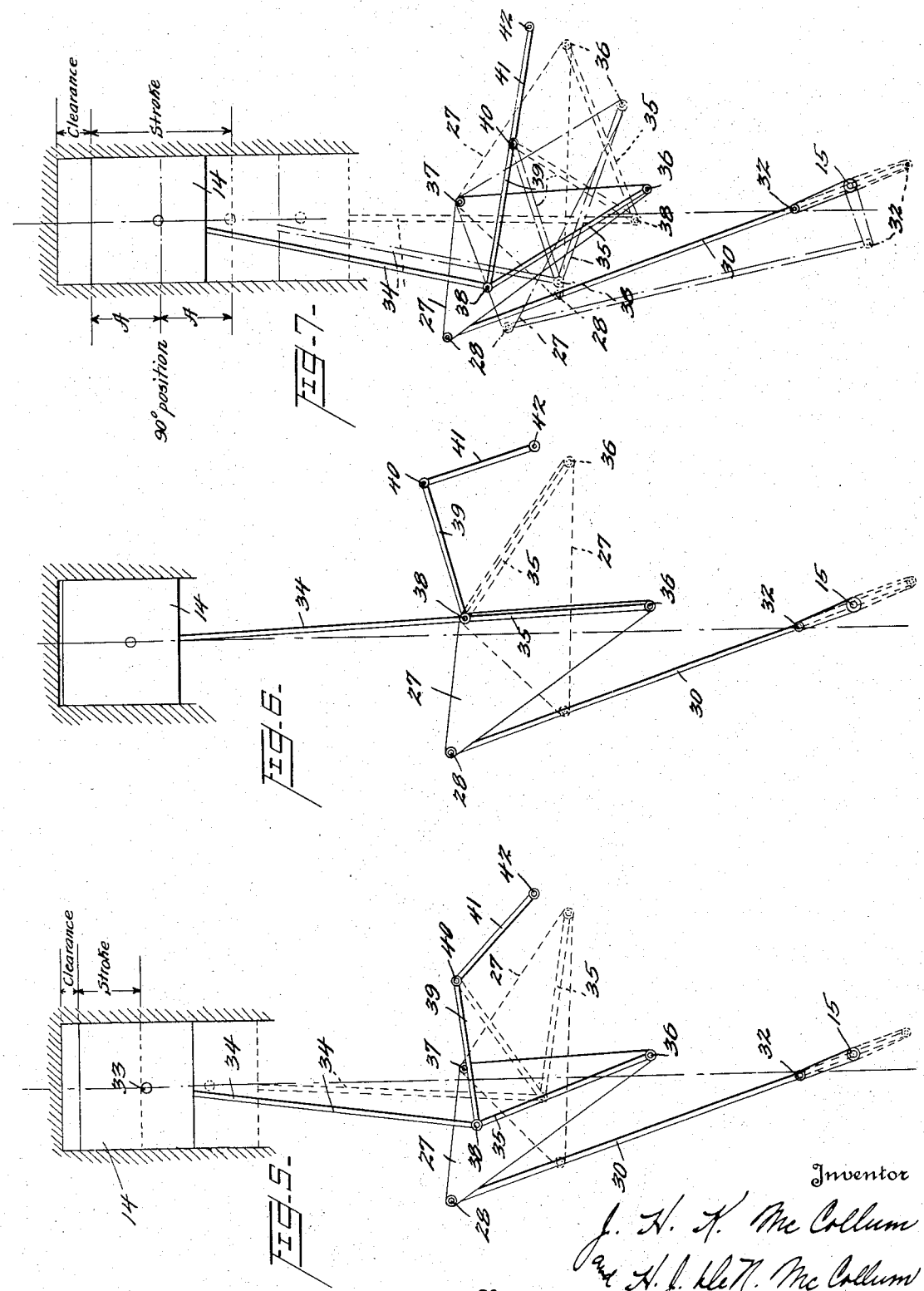

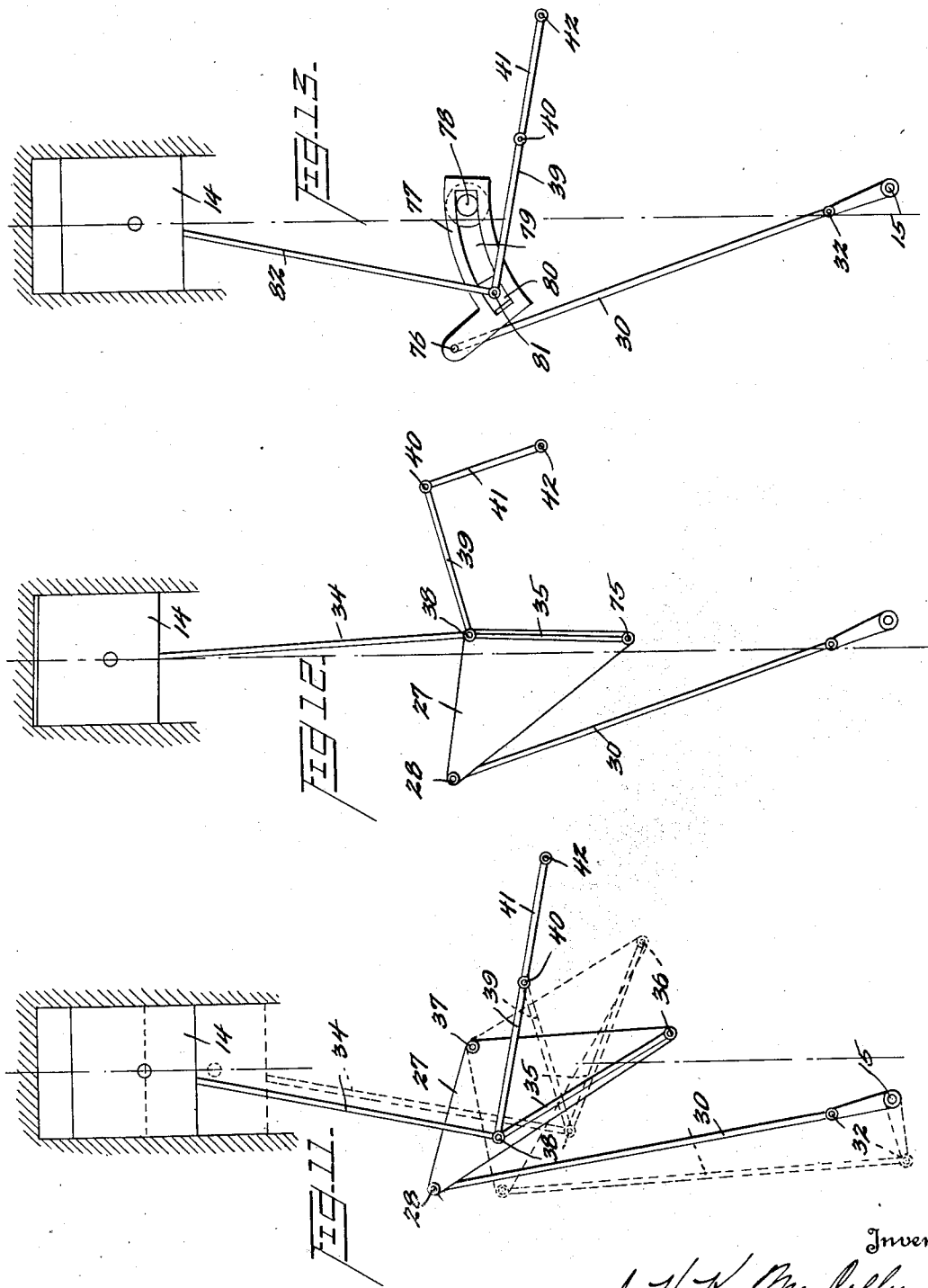

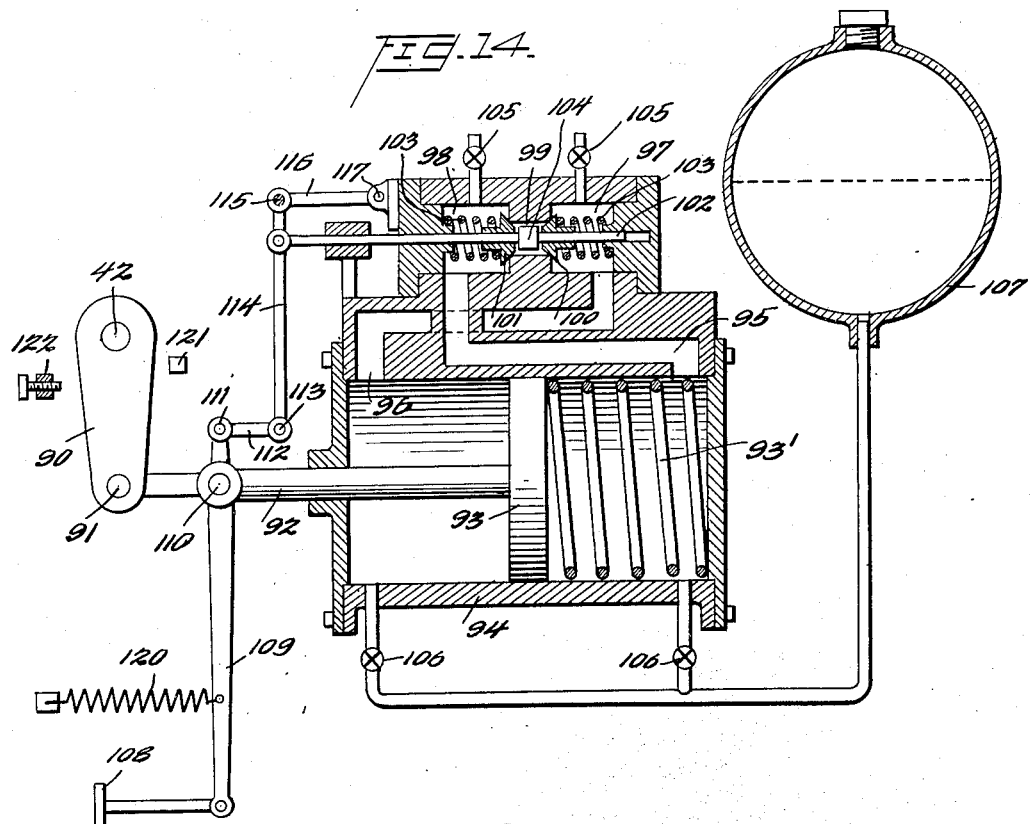
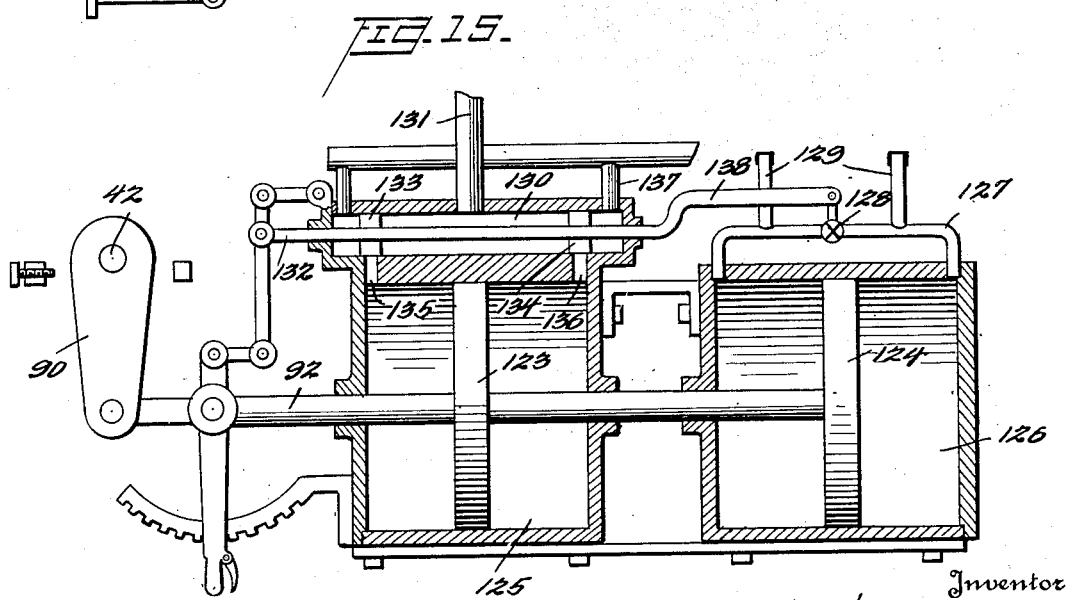

Patented May 16, 1933

1,909,372

UNITED STATES PATENT OFFICE

JAMES HARRY KEIGHLEY McCOLLUM AND HARRY JOHN DE NEVILLE McCOLLUM, OF LONG BRANCH, NEW JERSEY

VARIABLE STROKE INTERNAL COMBUSTION ENGINE

Continuation of application Serial No. 267,357, filed April 4, 1928. This application filed May 6, 1931. Serial No. 535,446.

This invention relates to internal combustion engines and more particularly to the method of and means for providing a variable stroke and variable compression in engines of the type mentioned. This application is a continuation of our prior application Serial 267,357, for variable stroke internal combustion engines, filed April 4, 1928.

From among the numerous novel features and objects of the invention the following have been selected as worthy of particular note and others will be apparent to those skilled in the art upon a consideration of the accompanying drawings and following specification.

1. The provision of an internal combustion engine having mechanism associating the piston and crankshaft permitting the stroke of the piston to be varied from zero to maximum while the engine is in operation.

2. The provision of mechanism associating the piston and crankshaft of an internal combustion engine, whereby the rate of movement and the amount of movement of the piston for any 90° of rotation of the crankshaft is similar to that for any other 90° of rotation, i. e. the piston is susceptible of simple harmonic motion.

3. The provision of mechanism associating the piston and crankshaft of an internal combustion engine which permits continuous variation of the length of stroke of the piston and which decreases the compression clearance in the cylinders as the stroke is shortened in order to maintain equal or provide increased efficiency at smaller loads.

4. The provision of an internal combustion engine in which the power output is entirely controlled by the length of stroke of the pistons and which operates at full throttle at all times and all speeds.

5. The provision of means for controlling the lift of the valves as the stroke of the engine is shortened and the compression space lessened.

6. The provision of automatically acting means for controlling the length of stroke of the pistons.

7. The novel arrangement and association of parts producing the above results.

In the drawings several exemplary embodiments of the invention have been disclosed and diagrams of operation are included in order that the invention may be more readily understood.

In said drawings:

Figure 1 is a transverse vertical section through an engine constructed according to the present invention;

Figure 2 is a partial horizontal section taken on line 2—2 of Fig. 1;

Figure 3 is a partial side elevation with a cover plate broken away to show interior mechanism;

Figure 4 is a central, longitudinal, vertical section through a single cylinder of the engine taken on line 4—4 of Fig. 1;

Figure 5 is a diagrammatic showing of the essential parts adjusted for a stroke intermediate maximum and minimum, showing the piston in both upper and lower positions to illustrate the length of stroke and the clearance;

Figure 6 is a view similar to Fig. 5 but showing the mechanism adjusted for minimum or substantially zero stroke;

Figure 7 is a view similar to Fig. 5 showing the parts adjusted for maximum stroke and showing the position of the piston at top and bottom and an intermediate position with the main crank 90° from that of the top and bottom positions;

Figure 8 shows a modified form of controlling crank and link;

Figure 9 is a view similar to Fig. 1 omitting unessential parts and showing a modified form of bell crank mechanism;

Figure 10 is an end elevation of the bell crank horizontal section on line 10 of Fig. 9;

Figure 11 is a diagrammatic showing of the parts so arranged that the crankshaft is on the opposite side of the center line of piston movement from that shown in the preferred form;

Figure 12 is a diagrammatic showing of a modification;

Figure 13 is a diagrammatic showing of a modification which omits the bell crank mechanism;

Figure 14 is a section through an automatic mechanism for adjusting the length of the stroke of the pistons; and Figure 15 is a section through another form of mechanism for controlling the length of the piston strokes, which mechanism requires the use of compressed air, steam or the like.

Internal combustion engines of the conventional type are uneconomical unless run at certain specified loads for which they are designed, for at those specified loads they have maximum fuel economy. At lighter loads, produced where the speed is maintained by throttling, the efficiency is materially reduced because of the lowered compression resulting from the smaller charge in the same clearance space; from the proportionally increased cooling and from the proportionally increased friction. Other factors contribute to make it unsatisfactory to operate a constant stroke engine by throttling. It is desirable in automotive vehicles to use large engines in order that effective acceleration and hill climbing can be had and yet these engines, as previously pointed out, are not economical at normal loads such for instance as running along a level highway.

The present invention contemplates the provision of an engine which always works at substantially maximum efficiency irrespective of the load. This result is obtained by varying the length of the stroke of the pistons in accordance with the power required and simultaneously varying the volume of the clearance space in order to maintain constant compression or to increase the compression with reduced stroke. This increase in compression at small loads can be permitted even though the compression at full stroke is all that can be used without the occurrence of detonation, because substantially the same area of cooling exists at shorter strokes as at the longer ones and, with a lesser volume of charge burning, the heat can be carried off sufficiently rapidly to prevent detonation even with the higher compression pressures. This form of engine is particularly desirable for automotive vehicles of the pleasure type since it permits the use of large engines operating at high economies and substantially eliminates gear shifting and the like. It also permits coasting without declutching, for the piston stroke can be set at zero and while the crankshaft rotates the pistons do not move and no charge is drawn into the cylinders, and no lubrication of the pistons is required. Hence there is no heavy smoking from unconsumed oil when power is again taken from the engine.

Referring to the drawings there is disclosed at 10 one cylinder of a multi-cylinder internal combustion engine provided with a suitable cooling jacket 11. The upper end of the cylinder is closed by a head 12 which preferably carries the valves 13 in the conventional manner of the valve-in-the-head engine. This form of engine is preferred for reasons which will be brought out later. The piston 14 is adapted to reciprocate in the cylinder in the conventional manner. Power from the piston is applied to the crankshaft 15 through mechanism later to be described. The crank case 16 is considerably deeper than that in the conventional form of engine and has the inturned flanges 17 at the top to which flanges on the cylinder block may be secured. It carries at the bottom an oil pan 18 and is provided between adjacent cylinders with large transverse, vertical webs 19 extending from the top to the bottom of the crank case and carrying at the bottom the upper halves of the bearings 20 for the main crankshaft, which may be of conventional form.

The valves are closed by springs 21 and are actuated from the cam shaft 22 by means of the tappets 23, push rods 24 and rocker arms 25 in the conventional manner. Any convenient means may be provided to drive the cam shaft at one-half the speed of the crankshaft, and since this means is conventional it has not been shown.

Supported in bearings 26 at the top of the webs 19 are bell cranks conveniently taking the form of triangular plates 27. In the form shown two are provided for each cylinder. These plates are spaced apart, as clearly shown in Figs. 2 and 4. At their outer tips they are connected together by a pin 28 which extends out beyond their faces and receives the small ends of the dual connecting rod 30 which, as shown in Fig. 4, has a common large end 31 journaled on the crank pin 32 of the main crankshaft. Each piston is provided with a wrist pin 33 to which is pivoted the upper end of the upper section 34 of a jointed connecting rod, the lower section 35 of which is journaled about the pin 36 connecting the lower apices of the triangular members 27. Thus it will be seen that the bell cranks are pivoted at 37 to the engine frame, connected to the main connecting rod at 28 and to the jointed connecting rod at 36. The parts 34 and 35 of the jointed connecting rod are pivoted together at 38 and also at this point connected to the control link 39 which is pivoted at 40 to the control crank or arm 41. The control cranks or arms of all of the cylinders are fixed to the control shaft 42 having bearings 43 in the side of the crank case and protected by the cover plate 44. It will be seen that rotation of the shaft 42 will affect the angularity of the two parts of the jointed connecting rod and this will in turn effect a change in the length of piston stroke.

In Fig. 3 is shown a means for manually rotating the control shaft. The shaft is seen to emerge from the end of the crank case 19 and to be provided with a worm wheel 45 engaged by a worm 46 on a shaft supported in bearings, not shown, and carrying the hand wheel 47 by which the shaft can be rotated. It is prevented from rotating under the impulses of the engine on the control shaft due to the irreversibility of the worm and worm wheel mechanism.

As will be shown later, the stroke of the piston increases as the link 39 and the control crank 41 come more nearly into alignment. As the angularity between these two decreases the stroke is shortened and at the same time the piston, at the top of its stroke, approaches closer to the cylinder head. In order that minimum compression space or clearance may be provided it is necessary to use a valve-in-the-head type of engine, for the volume contained in the side pocket, for the valves, in the L head type engine, would be too great at small strokes. In the valve-in-the-head type engine the valves open directly into the cylinders and where it is desired to have quite small clearance on very short stroke there is a possibility of interference between the valves and the piston head and to prevent this the device shown in Fig. 3 is resorted to. Here the cams 22' on the cam shaft 22 are tapered in form, as shown, and the shaft 22 is longitudinally movable in its bearings. When it is moved toward the right as seen in Fig. 3 the tappets 23 will not be lifted so high to open the valves as when it is moved toward the left. Longitudinal movement of the cam shaft is effected through the lever 50 pivoted at 51 to a bracket mounted on the crank case. Both ends of this lever are forked and provided with gudgeon pins bearing respectively in circular groove 53 in an enlargement on the end of the cam shaft, and in the groove 54 in an enlargement on the control shaft 42. This latter groove is so arranged that throughout the positions in which the control crank effects the longer strokes of the engine, the cam shaft is positioned to give maximum lift to the valves, but as the piston stroke is so shortened and the clearance so reduced that the head of the piston approaches the valves, the groove 54 is rotated until the inclined portion clearly seen in Fig. 3 is effective to shorten the valve stroke so that there will be no interference between the valves and the piston. It will be seen that this is effected automatically as the piston stroke is changed.

In the form of device just described the bell cranks 27 are plates spaced apart and the main conecting rods 30 are in two parts pivoted at the outer sides of the bell cranks. The jointed connecting rod has as its upper portion a single rod bearing on the joint pin 56 as seen in Fig. 4. The lower portion 35 of this jointed connecting rod may be in two parts bearing at the bottom on the pin 36 connecting the bell cranks and each part having an enlarged end 57 journaled on the pin 56, one on either side of the part 34. These parts 57 are formed with journals on their outer surfaces to receive the large bearing ends 57 of the two parts of the control link 39. In Fig. 2 the control arms are shown as single rods secured to the shaft 42 and fitting between the ends of the two part control link to which they are pivoted by the pin 40. It is obvious that various other arrangements of parts can be effected, such as where the bell crank lever and the main connecting rod are single instead of double and the control means are either single or double. In Fig. 8 is shown the use of a crank 60 on the control shaft 42 to take the place of the control arm shown at 41 in Fig. 1. It is shown as having a crank pin 61 on which bear the ends of the control link 39.

The pivots for the bell cranks are outside of the two triangles 27 as clearly shown in Figs. 2 and 4 in order that the jointed connecting rod and control link may have freedom of movement between these bell cranks. This permits the bell cranks to be connected together at but the two points 28 and 36 unless resort is had to the arrangement shown in Figs. 9 and 10, wherein the bell cranks are connected at 28 and 36 as in Fig. 1 and again at 63 beyond the main bearings for the bell cranks in a direction opposite to the pin 28. In order that this connection may not interfere with the control link 39' its inner end is hooked as shown at 64 to reach around the connecting pin 63 and engage with the joint 38 between the two parts of the connecting rod. Obviously various other mechanical expedients can be resorted to, to associate the various parts without departing from the principles already set forth.

By referring to Figs. 5, 6 and 7 a better idea of the operation of the device can be obtained. Here the parts carry the same numbers as in Figs. 1 to 4 inclusive but are shown more or less diagrammatic. Referring first to Fig. 5 it will be seen that the control arm and link are so adjusted that a stroke intermediate maximum and minimum is imparted to the piston and the legends indicate length of stroke and the amount of clearance between the top of the piston at top center and the cylinder head. Two positions of the bell crank are shown, that for top center in full lines and for bottom center in dotted lines. It will be seen that the link 39 swings about its pivot 40 and changes the angular relation between the two parts of the jointed connecting rod during each stroke of the piston. It will further be noted that what is usually referred to as "top dead center" of the main crank does not occur when this crank is vertical but when it is inclined at the angle shown.

Figure 6 shows the device adjusted to give zero stroke. In order that this may be effected it is necessary that the lower portion 35 of the jointed connecting rod have a length exactly equal to the distance between the points 36 and 37 on the bell crank. Then when the control arm is moved until the joint 38 is coaxial with the pivots 37 for the bell crank any movement of the bell crank has no effect on the piston and the crankshaft can rotate while the piston remains stationary.

Figure 7 shows the device adjusted for maximum stroke where the link 39 and the control arm 41 are in alignment at top dead center. The legends indicate the full stroke and the clearance which is seen to be much larger than that in Fig. 5 which is, in turn, larger than that in Fig. 6. The position of the bell crank has been plotted for top center shown in full lines, bottom center shown in dotted lines and an intermediate position shown in dot and dash lines. This intermediate position corresponds to a 90° rotation of the main crank from either of the positions in which top and bottom centers are indicated. Here can be seen that in the 90° position of the crank the piston is exactly half-way between its top and bottom positions as indicated by the distances A which are equal to each other. This is different from the conventional form of engine where at the 90° position of the crank the piston is nearer to the bottom of the stroke than it is to the top which results in unbalance in four cylinder engines. The present device, by virtue of its ability to be adjusted to produce simple harmonic motion of the piston, results in an engine of even four cylinders being inherently balanced as regards vertical components of the piston movements.

By considering Figs. 5, 6 and 7 it can readily be appreciated how the clearance space is reduced as the stroke is shortened. By considering the piston at top center, which will always occur with the same angularity of the crankshaft with all adjustments of stroke, it will be seen that by pulling up on the control arm the link 39 draws up on the joint of the jointed connecting rod and increases the angle between the two parts and thus increases the distance between the point 36 and the wrist pin so that the piston moves closer to the top of the cylinder.

The design of the engine is susceptible of various changes. For instance in the views already discussed, the main crankshaft has been to the right of the center line of movement of the piston, that is it has been on the same side of this line as the axis of the control shaft. In Fig. 11 is shown a modification in which the main crankshaft is to the left of the center line and in which the shape of the bell crank is slightly different than in the previous forms, that is the interior angle of the triangle at the pivot is more obtuse. This is in order that at the 90° position of the crank there will be a right angle between the main connecting rod and a line between the points 28, 37, a condition necessary to obtain the harmonic motion previously referred to. In designing the engine it has been kept in mind that the thrusts should be as much as possible downwardly and these can be maintained so in the form of Fig. 11 even by increasing the interior angle of the bell crank because of the difference in position of the main crankshaft. The engine can, if desired, be designed to give an unsymmetrical movement for the 90° rotations of the crank and this can most readily be effected by changing the position of the control shaft. As it is arranged in Figs. 1 to 7, it lies on the arc described by the point 36 when the bell crank revolves. The position of the top of the piston and the corresponding positions of the bottom, can be adjusted in respect to the cylinder head as desired by changing the length of the control link 39.

It is possible by various features of design to eliminate the necessity of shortening the stroke of the valves as the stroke of the piston is decreased. One way of doing this is indicated in Fig. 12 where the jointed connecting rod has its lower end shortened and pivoted at 75 and the control arm and link so adjusted that instead of coming to a straight line at minimum stroke, the two parts 34 and 35 of the jointed connecting rod make an angle the reverse of that made when the piston is at the bottom of its stroke. Thus when the two parts of the connecting rod are in alignment the piston is at the top of its stroke and moves downwardly slightly as the crank comes to what corresponds to normal dead center in the other forms. As the pointed connecting rod moves to the two sides of the straight line there is but little movement of the piston for considerable crank shaft movement and yet immediately upon a change of the angle of the control arm, the operation of the device becomes almost identical with that of the other modifications. In this manner the clearance can be prevented from becoming too small so that no interference between the valves and the piston takes place and yet after leaving the position of minimum clearance, the clearance varies with the stroke substantially as in the other forms.

Figure 13 shows a modification in which the main connecting rod 30 is connected at 76 to an arm on the link 77 pivoted at 78 and provided with the arcuate slot 79 in which the block 80 is adapted to reciprocate. This block 80 has pivoted thereto at 81 the upper connecting rod 82 and also has pivoted thereto the control link 39 pivoted at 40 to the control arm 41 on the control shaft 42. The operation of this device is substantially identical with that of the previous forms but it will be seen that the result obtained is produced by entirely different mechanism. The action of the link 77 is to permit a variation in the length of the stroke of the piston while maintaining a constant crank pin circle for the crank pin 32. Where this method is resorted to with ordinary variable stroke linkages the action of the piston is substantially the same as if its connecting rod were connected directly to the crank pin, that is it is not given a true simple harmonic motion. However, by using the control arm and control link and the curved slot 79, the action of the previously described modifications of this device is approached and great improvement is effected over the normal manner of regulating the power of an internal combustion engine.

It has been shown that the device of the present invention operates throughout a wide range of lengths of piston stroke and that manual control may be used to rotate the shaft 42 carrying the control arms. However, this form of control is not desirable because of its slowness and because of the power required to oppose the thrust of the pistons. The device is susceptible to automatically adjusting its control shaft position under manual regulation. It may be appreciated by a study of the figures that the control arm and hence the control shaft is subjected to alternately opposite thrusts when the piston is on the up-stroke and on the down-stroke and therefore there is a tendency for the control shaft 42 first to rotate in one direction and then to rotate in the other.

The device of Fig. 14 makes use of this tendency to permit the shaft to be rotated in either direction as desired by the use of a simple control which may take the place of the foot throttle in an automotive vehicle. The shaft 42 is shown to be provided with a crank arm 90 pivoted at 91 to the end of a piston rod 92 carrying the piston 93 operating in a cylinder 94. The two ends of the cylinder are connected with each other through the passages 95, 96 and the valve chambers 97 and 98. The two valve chambers are connected together by the passage 99 and in each chamber and bearing against the edge of the passage 99 is a poppet valve 100, 101. The two poppet valves are loosely mounted on a stem 102 and each held against its seat by a coil spring 103. The stem is provided with an enlargement 104 which is less in length than the distance between the two valves so that slight movement of the stem can be had without moving either valve. In order to put the device into operation it is filled with oil by opening the valves 105 in the compartments 97—98 and opening the valves 106 in the oil lines loading from the oil reservoir 107 so that oil is permitted to fill both ends of the cylinder and all of the passages and valve chambers. The valves 105 and 106 are then closed. With no chance of leakage from one end of the cylinder to the other, the impulses given to the connecting rod 92 by the thrusts on the shaft 42 are resisted by the piston. However, if the valve stem 102 is moved for instance to the right until the enlargement 104 lifts the valve 100 from its seat, oil will be able to flow through the passage 96 and valve chamber 97 into the space 99 between the valves and will lift the valve 101 from its seat. This valve 101 will act as a check valve permitting oil flow from the chamber 97 to the chamber 98 but not reversely and thus every impulse of the shaft 42 in a clockwise direction, as viewed in Fig. 14, will move the piston to the left and every one tending to move it in a counterclockwise direction will be resisted and thus by holding the valve 100 open the shaft 42 can be allowed to assume the position desired. To permit it to move in the other direction it is only necessary to open the valve 101 and the reverse operation takes place.

In order that a certain speed of the engine may be fixed and held by means of a foot controlled pedal such as 108, this pedal is arranged to control the valve stem 102 as follows. The pedal 108 is connected to an arm 109 pivoted at 110 to the piston rod 92 and extending beyond it where it is pivoted at 111 to the link 112, pivoted at 113 to the floating link 114, pivoted at 115 to the link 116, pivoted at 117 to the frame of the valve chamber. Intermediate its ends the link 114 is pivoted to the end of the valve stem 102. Now if the pedal 108 is pressed down a certain distance and held the valve 101 will be opened and the piston will be permitted to move to the right. In so doing it will move the point 110 to the right until the valve stem is restored to its central position when movement of the piston will be stopped. This produces a follow-up movement substantially identical to that used for controlling the linking up of the valve mechanism of locomotives and for steering steamships. If the pedal is released it is pulled up by the spring 120 to its upper position and in so doing opens the valve 100 permitting the piston to move to the left until the follow-up motion stops it and leaves the piston stationary when both valves become seated. If desired stops 121 and 122 may be provided to limit the amount of movement of the control shaft. A spring 93' may be fitted to tend to move the piston to the left as shown since the piston impulses are stronger in the other direction. The spring also tends to move the linkage to the position of shortest piston stroke. The device will operate however without this spring.

Figure 15 shows a further means of controlling the shaft 42 where a source of compressed air, steam or the like is available. Here the shaft 42 is connected by the lever 90 to the piston rod 92, carrying on it two pistons, 123 and 124 operating in the power cylinder 125 and the buffer 126 respectively. The cylinder 126 is filled with oil and the two ends are connected by the pipe 127 containing therein the by-pass valve 128. The pipe 127 is provided with filling pipes 129 capped as shown. The cylinder 125 is provided with a valve chamber 130 adapted to be supplied with fluid under pressure through the pipe 131. Compressed fluid is permitted to flow to one end or the other of the cylinder by movement of the valve stem 132 carrying on it the pistons 133 and 134 covering the ports 135 and 136 leading to the two ends of the cylinder 125. If the stem is moved to the left fluid is permitted to enter through the port 135 and move the piston to the right and escape of fluid from the right end of the piston is permitted through opening 136 and the exhaust port 137. The reverse is true when the valve stem is operated in the other direction. The valve stem is continued through as at 138 and connected to the control lever of the valve 128 which permits movement of the piston 124 by allowing transfer of the oil from one end to the other of cylinder 126. This device is provided with a follow-up movement which is identical with that disclosed in Fig. 14, and the operation will be obvious from the drawing so that no further description will be necessary.

Having thus described the invention, what is claimed as new and desired to be secured by Letters Patent is:

1. In a variable stroke engine, in combination, a cylinder, a piston therein, a crank shaft having a crank and means associating said crank and piston to permit variation in the length of stroke of said piston, said means also moving the center of travel of the piston toward the cylinder head as the stroke is shortened.

2. In a variable stroke engine, in combination, a cylinder, valves in the head of said cylinder, a piston adapted to be reciprocated in said cylinder, a crank shaft having a crank, means associating said piston and crank to permit adjustment of the clearance between said cylinder head and the piston at the upper end of the piston stroke, and means to reduce the lift of the valves when the clearance is such as to require it to prevent interference.

3. In a variable stroke engine, in combination, a cylinder, valves to control the flow of gases to and from said cylinder, a piston adapted to reciprocate in said cylinder, a crank shaft having a crank, means associating said piston and crank to permit adjustment of the length of stroke and clearance of said piston and means to adjust the lift of the valves disproportionately to the change in clearance.

4. In a variable stroke internal combustion engine, in combination, a cylinder, valves for said cylinder, a piston adapted to reciprocate in said cylinder, a crankshaft having a fixed crank, means associating said piston and crank, a control device cooperating with said means to adjust the clearance between the piston head and cylinder head and means to reduce the lift of the valves as the clearance is reduced.

5. In a variable stroke internal combustion engine, in combination, a cylinder, a piston adapted to reciprocate in said cylinder, a crankshaft having a crank of fixed throw, mechanism associating said piston and crank to permit adjustment of the length of stroke of said piston and means actuated by the thrust of said piston to actuate said mechanism.

6. In a variable stroke internal combustion engine, in combination, a cylinder, a piston adapted to reciprocate in said cylinder, a crankshaft havng a crank of fixed throw, mechanism associating said piston and crank to permit adjustment of the length of stroke of said piston, means actuated by the thrust of said piston to actuate said mechanism and regulating means for said control mechanism.

7. In a variable stroke internal combustion engine, in combination, a cylinder, a piston adapted to reciprocate in said cylinder, a crankshaft having a crank of fixed throw, linkage associating said piston and crank, a control member for said linkage subject to alternate thrusts therefrom and adapted upon movement to adjust the length of stroke of said piston and means to permit regulated movement of said control member in a selected direction under the action of said thrusts.

8. In a variable stroke internal combustion engine, in combination, a cylinder, a piston adapted for reciprocation in said cylinder, a crankshaft having a crank, a bell crank pivotally mounted at one of its apices adjacent the open end of said cylinder, a jointed connecting rod pivoted at its ends to the piston and to a second apex of said bell crank, a main connecting rod pivoted at its ends to the crankshaft crank and to the third apex of the bell crank, and a link pivoted at one end to the joint in said jointed connecting rod.

9. In a variable stroke internal combustion engine, in combination, a cylinder, a piston adapted for reciprocation in said cylinder, a crankshaft having a crank, a bell crank pivotally mounted at one of its apices adjacent the open end of said cylinder, a jointed connecting rod pivoted at its ends to the piston and to a second apex of said bell crank, a main connecting rod pivoted at its ends to the crankshaft crank and to the third apex of the bell crank, a link pivoted at one end to the joint in said jointed connecting rod and an arm adjustable about an axis and having its free end pivoted to the other end of said link.

10. In a variable stroke internal combustion engine, in combination, a cylinder, a piston adapted for reciprocation in said cylinder, a crankshaft having a crank of fixed throw, a bell crank having an apex pivoted to the engine frame, a main connecting rod pivoted to an apex of said bell crank and to said main crank, a two part connecting rod between the third apex of said bell crank and the piston, the joint in said two part rod being positioned at a distance from the connection thereof to the bell crank the same as the distance from that connection to the main pivot of said bell crank and means to restrain said joint to move in the arc of a circle.

11. In a variable stroke internal combustion engine, in combination, a cylinder, a piston adapted for reciprocation in said cylinder, a crankshaft having a crank of fixed throw, a bell crank having an apex pivoted to the engine frame, a main connecting rod pivoted to an apex of said bell crank and to said main crank, a two part connecting rod between the third apex of said bell crank and the piston, the joint in said two part rod being positioned at a distance from the connection thereof to the bell crank the same as the distance from that connection to the main pivot of said bell crank, means to restrain said joint to move in the arc of a circle and means to change the position of the center of said arc to change the length of the piston stroke.

12. In a variable stroke internal combustion engine, in combination, a cylinder, a piston adapted to reciprocate in said cylinder, a crankshaft having a crank of fixed throw and linkage associating said piston and crank to permit adjustment of the piston stroke from zero to a maximum.

13. In a variable stroke internal combustion engine, in combination, a cylinder, a piston adapted to reciprocate in said cylinder, a crankshaft having a crank of fixed throw and linkage associating said piston and crank to permit adjustment of the piston stroke from zero to a maximum, said linkage being arranged to impart simple harmonic motion to said piston at all lengths of stroke.

14. In a variable stroke internal combustion engine, in combination, a cylinder, a piston adapted to reciprocate in said cylinder, a crankshaft having a crank of fixed throw, a linkage associating said piston and crank, means to adjust said linkage to vary the stroke of the piston, said means and linkage being arranged to reduce the amount of clearance of said piston as the stroke is shortened.

In testimony whereof we hereunto affix our signatures.

JAMES HARRY KEIGHLEY McCOLLUM
HARRY JOHN DE NEVILLE McCOLLUM